United States Patent
Dykstra et al.

(10) Patent No.: US 10,662,753 B2
(45) Date of Patent: May 26, 2020

(54) AUTOMATED OPTIMAL PATH DESIGN FOR DIRECTIONAL DRILLING

(71) Applicant: Halliburton Energy Services, Inc., Houston, TX (US)

(72) Inventors: Jason Daniel Dykstra, Spring, TX (US); Yuzhen Xue, Humble, TX (US); Venkata Madhukanth Vadali, Houston, TX (US); Xiaoqing Ge, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 124 days.

(21) Appl. No.: 15/525,534

(22) PCT Filed: Dec. 31, 2014

(86) PCT No.: PCT/US2014/073017
§ 371 (c)(1),
(2) Date: May 9, 2017

(87) PCT Pub. No.: WO2016/108897
PCT Pub. Date: Jul. 7, 2016

(65) Prior Publication Data
US 2017/0335671 A1 Nov. 23, 2017

(51) Int. Cl.
*E21B 44/00* (2006.01)
*E21B 41/00* (2006.01)
(Continued)

(52) U.S. Cl.
CPC .......... *E21B 44/00* (2013.01); *E21B 41/0092* (2013.01); *G05B 13/048* (2013.01); *E21B 47/18* (2013.01); *G05B 2219/45208* (2013.01)

(58) Field of Classification Search
CPC ........ E21B 44/02; E21B 49/00; E21B 47/024; E21B 7/04; E21B 41/0092; E21B 44/00;
(Continued)

(56) References Cited

U.S. PATENT DOCUMENTS 5,390,748 A    2/1995   Goldman
5,419,405 A *  5/1995   Patton ....................... E21B 7/04
                                                     175/27
(Continued)

FOREIGN PATENT DOCUMENTS

FR    2923855      5/2009
RU    2436947     12/2011
(Continued)

OTHER PUBLICATIONS

Adaptive Control for Directional Drilling Systems by Sun et al. dated May 31, 2012.
(Continued)

*Primary Examiner* — Michael R Wills, III
(74) *Attorney, Agent, or Firm* — Jason Sedano; C. Tumey Law Group LLC

(57) ABSTRACT

Methods and systems are provided for optimizing a drill path from the surface to a target area below the surface. A method for operating an automated drilling program may comprise drilling to a target location along a drill path, updating a drilling path model based at least on data obtained during the state of drilling to the target location, creating a modified drill path to the target location based on at least the drilling path model in real-time as the step of drilling to the target location along the drill path is being performed, and drilling to the target location along the modified drill path.

17 Claims, 6 Drawing Sheets

(51) Int. Cl.
*G05B 13/04* (2006.01)
*E21B 47/18* (2012.01)

(58) Field of Classification Search
CPC ..... E21B 47/18; E21B 44/005; G05B 13/048; G05B 2219/45208
See application file for complete search history.

(56) References Cited

U.S. PATENT DOCUMENTS

| | | | |
|---|---|---|---|
| 6,109,368 | A | 8/2000 | Goldman et al. |
| 6,438,495 | B1 | 8/2002 | Chau et al. |
| 6,523,623 | B1 | 2/2003 | Schuh |
| 6,577,954 | B2 | 6/2003 | Alft et al. |
| 7,000,710 | B1 | 2/2006 | Umbach |
| 7,172,037 | B2 | 2/2007 | Dashevskiy et al. |
| 8,010,290 | B2 | 8/2011 | Illfelder |
| 8,315,789 | B2 | 11/2012 | Dunbabin et al. |
| 8,672,055 | B2 | 3/2014 | Boone et al. |
| 8,751,208 | B2 | 6/2014 | Brouwer et al. |
| 2004/0028476 | A1 | 2/2004 | Payne et al. |
| 2004/0047234 | A1 | 3/2004 | Armstrong et al. |
| 2006/0247903 | A1 | 11/2006 | Schottle et al. |
| 2007/0185696 | A1 | 8/2007 | Moran et al. |
| 2008/0156531 | A1* | 7/2008 | Boone ................ E21B 7/06 175/27 |
| 2008/0275648 | A1 | 11/2008 | Illfelder |
| 2008/0314641 | A1 | 12/2008 | McClard |
| 2011/0172976 | A1 | 7/2011 | Budiman et al. |
| 2013/0140037 | A1 | 6/2013 | Sequeira et al. |
| 2013/0341092 | A1* | 12/2013 | Hay ................... E21B 7/04 175/24 |
| 2014/0151121 | A1* | 6/2014 | Boone ................ E21B 44/02 175/27 |
| 2015/0267525 | A1* | 9/2015 | May .................. E21B 44/005 700/275 |
| 2016/0201449 | A1* | 7/2016 | Dirksen .............. E21B 7/10 702/9 |
| 2016/0230530 | A1 | 8/2016 | Dykstra et al. |
| 2016/0290118 | A1 | 10/2016 | Xue et al. |

FOREIGN PATENT DOCUMENTS

| | | |
|---|---|---|
| RU | 2471980 | 1/2013 |
| WO | 2010039317 | 4/2010 |
| WO | 2014011171 | 1/2014 |
| WO | 2014091462 | 6/2014 |

OTHER PUBLICATIONS

Designing and Optimizing Deviated Wellbore Trajectories using Novel Particle Swarm Algorithms by Atashnezhad et al. dated May 16, 2014.
PCB Drill Path Optimization by Combinatorial Cuckoo Search Algorithm by Lim et al. dated Feb. 23, 2014.
International Search Report and Written Opinion for Application No. PCT/US2014/073017 dated Sep. 25, 2015.
Russian Search Report for Application No. 2017110273 dated Jun. 22, 2018.
Australian Examination Report for Application No. 2014415569 dated Oct. 9, 2017.

* cited by examiner

AUTOMATED OPTIMAL PATH DESIGN FOR DIRECTIONAL DRILLING

BACKGROUND

The present disclosure relates generally to earth formation drilling operations and, more particularly, to systems and methods of drilling control.

In drilling operations, typical drilling processes may be relatively complex and involve considerable expense. Most of these operations are done by hand with experienced operators running the drilling platform. There is a continual effort in the industry to develop improvement in safety, cost minimization, and efficiency. The advancements of computerized and automated systems in drilling processes are the next step in achieving these goals. With robotic and automated systems for drilling processes in early stages of development for the industry, there is a need for more efficient, improved, and optimized drilling processes.

BRIEF DESCRIPTION OF THE DRAWINGS

These drawings illustrate certain aspects of some of the examples of the present invention, and should not be used to limit or define the invention.

DETAILED DESCRIPTION

Figure 1A:
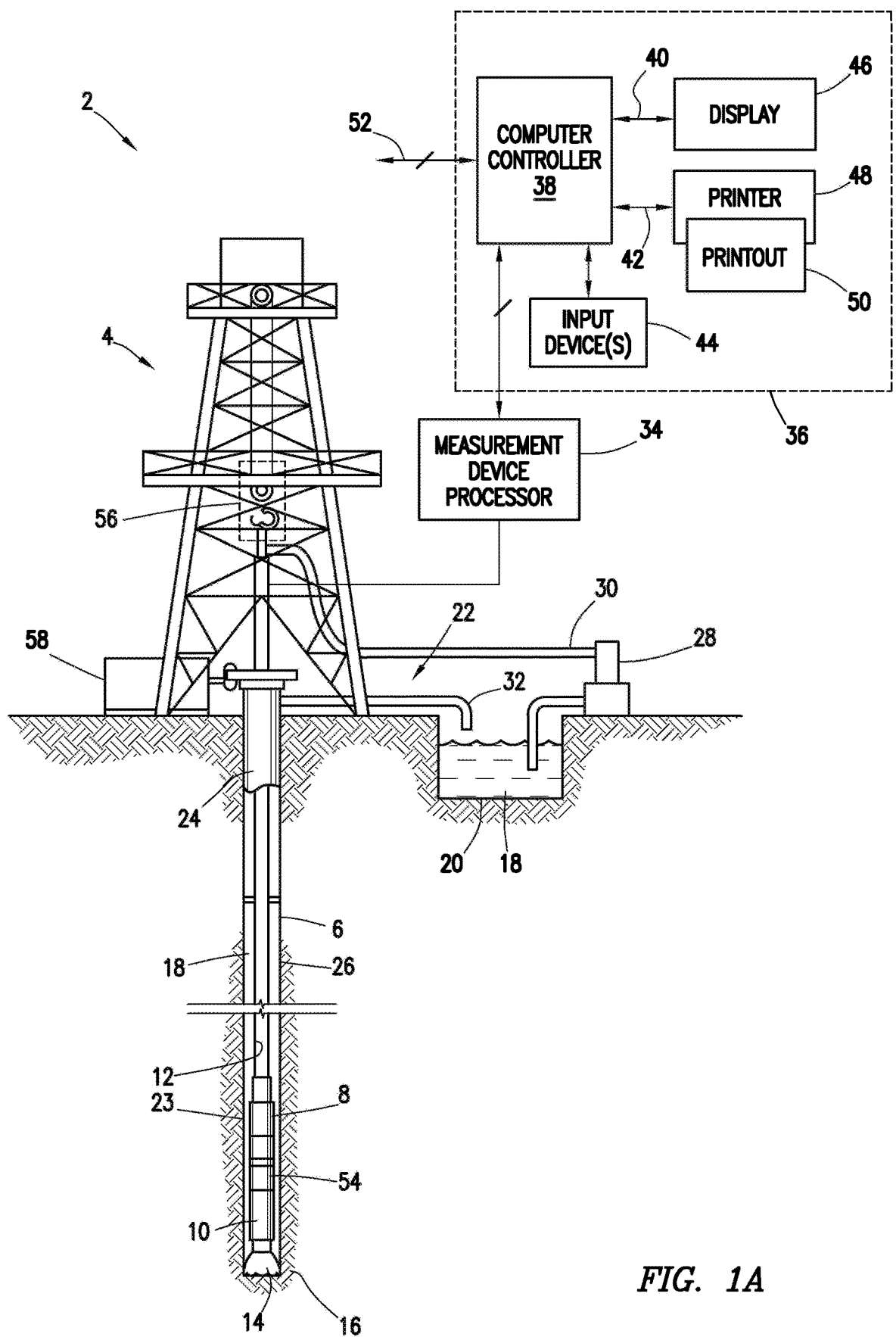
FIG. 1A is a diagram of an example system.

The present disclosure relates generally to earth formation drilling operations and, more particularly, to systems and methods of drilling control. Described below, the disclosure describes a system that automatically designs an adaptive optimal drilling path based on the real-time surveys and dynamic model based drilling path prediction. The system may replace the driller manipulation to track an offline designed drilling path. It may also automatically re-design the drilling path based on the current state of drilling, formation types, updated drilling model, path deviations, and other information in a manner that is optimal to reach a target area. The optimization cost functions take downhole conditions, equipment wear and efficiencies, surface input constraints, model based path predictions, and other input factors to design or re-design a path that increases drilling efficiency and decreases cost per foot of drilling.

Certain examples of the present disclosure may be implemented at least in part with an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Certain examples of the present disclosure may provide for automatically controlling a drilling process. Certain examples may make all or a subset of decisions during a drilling process and may control one or more of a top drive, a draw works, and pumps. Certain examples may optimize a drilling process and provide command inputs to one or more drill string control subsystems. The optimization may be updated dependent on a drilling parameter model, which may include, but not be limited to, a bit model, as it changes with time. Certain examples may overcome non-linearity in a drilling process and remove or minimize them as needed.

FIG. 1A shows one non-limiting example drilling system 2, in accordance with certain examples of the present disclosure. Drilling system 2 may include a drilling rig 4 disposed atop a borehole 6. A logging tool 8 may be carried by a sub 10, typically a drill collar, incorporated into a drill string 12 and disposed within the borehole 6. A drill bit 14 may be located at the lower end of the drill string 12 and carves a borehole 6 through the earth formations 16. Drilling mud 18 may be pumped from a storage reservoir pit 20 near the wellhead 22, down an axial passageway (not illustrated) through the drill string 12, out of apertures in the bit 14 and back to the surface through the annulus 23. Casing 24 may be positioned in the borehole 6 above the drill bit 14 for maintaining the integrity of an upper portion of the borehole 6.

The annulus 23 between the drills string 12, sub 10, and the sidewalls 26 of the borehole 6 may form the return flow path for the drilling mud 18. Drilling mud 18 may be pumped from the storage reservoir pit 20 near the well head 22 by pumping system 28. The drilling mud 18 may travel through a mud supply line 30 which may be coupled to a central passageway extending throughout the length of drill string 12. Drilling mud 18 is, in this manner, may be forced down drill string 12 and exit into the borehole 6 through apertures in the drill bit 14 for cooling and lubricating the drill bit and carrying the formation cuttings produced during the drilling operation back to the surface. A fluid exhaust conduit 32 may be connected from the annulus 23 at the well head 22 for conducting the return drilling mud 18 from the borehole 6 to the storage reservoir pit 20.

The logging tool 8 can be any conventional logging instrument such as acoustic (sometimes referred to as sonic), neutron, gamma ray, density, photoelectric, nuclear magnetic resonance, or any other conventional logging instrument, or combinations thereof, which can be used to measure lithology or porosity of formations surrounding an earth borehole. The logging data can be stored in a conventional downhole recorder (not illustrated), which can be accessed at the earth's surface when drill string 12 is retrieved, or can be transmitted to the earth's surface using telemetry such as the conventional mud pulse telemetry systems. The logging data from the logging tool 8 may be communicated to a surface measurement device processor 34 to allow the data to be processed for use in accordance with the examples in the present disclosure as described herein. In addition to MWD instrumentation, wireline logging instrumentation may also be used. The wireline instrumentation may include any conventional logging instrumentation which can be used to measure the lithology and/or porosity of formations surrounding an earth borehole, for example, such as acoustic, neutron, gamma ray, density, photoelectric, nuclear magnetic resonance, or any other conventional logging instrument, or combinations thereof, which can be used to measure lithology.

An information handling system 36 may be communicatively coupled to one or more components of drilling system 2 in any suitable manner. The information handling system 36 may be configured to implement one or more of the examples described herein. The information handling system 36 may include a device, referred to herein as computer/controller 38, that may include any suitable computer, controller, or data processing apparatus, further being programmed for carrying out the method and apparatus as further described herein. Computer/controller 38 may include at least one input for receiving input information and/or commands, for instance, from any suitable input device (or devices) 44. Input device (devices) 44 may include a keyboard, keypad, pointing device, or the like, further including a network interface or other communications interface for receiving input information from a remote computer or database. Still further, computer/controller 38 may include at least one output for outputting information signals and/or equipment control commands. Output signals can be output to a display device 46 via signal lines 40 for use in generating a display of information contained in the output signals. Output signals can also be output to a printer device 48 for use in generating a printout 50 of information contained in the output signals. Information and/or control signals 52 may also be output via any suitable means of communication, for example, to any device for use in controlling one or more various drilling operating parameters of drilling rig 4, as further discussed herein. In other words, a suitable device or means is provided for controlling a parameter in an actual drilling of a well bore (or interval) with the drilling system in accordance with certain examples described herein. For example, drilling system 2 may include equipment such as one of the following types of controllable motors selected from a down hole motor 54, a top drive motor 56, or a rotary table motor 58, further in which a given rpm of a respective motor may be remotely controlled. The parameter may also include any other suitable drilling system control parameter described herein.

Computer/controller 38 may provide a means for generating a geology characteristic of the formation per unit depth in accordance with a prescribed geology model. Computer/controller 38 may provide for outputting signals on signal lines 40, 42 representative of the geology characteristic. Computer/controller 38 may be programmed for performing functions a s described herein, using programming techniques known in the art. In one embodiment, a non-transitory computer-readable medium may be included, the medium having a computer program stored thereon. The computer program for execution by computer/controller 38 may be used to optimize a drilling parameter of the drill string in accordance with examples described herein. The programming of the computer program for execution by computer/controller 38 may further be accomplished using known programming techniques for implementing the examples as described and discussed herein.

Figure 1B:
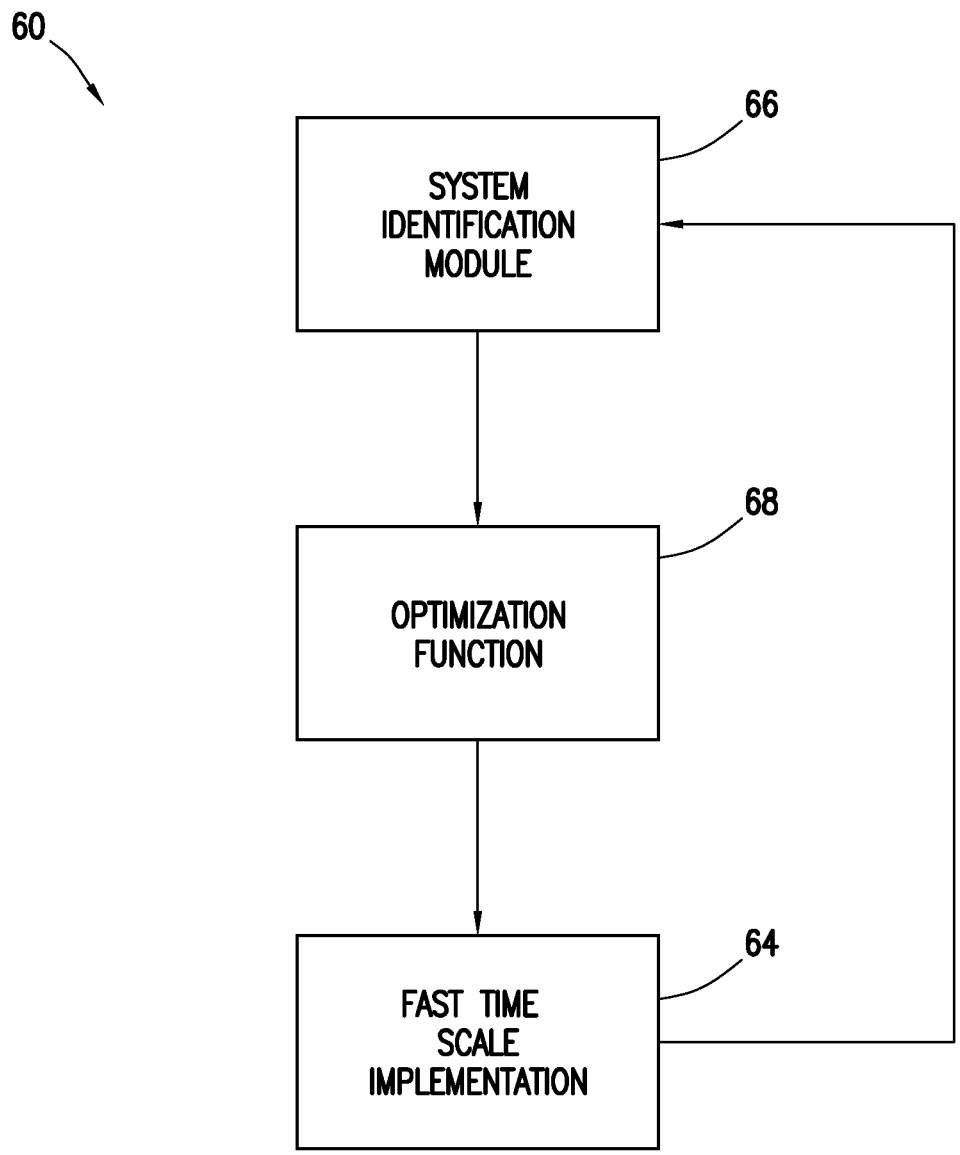
FIG. 1B is a diagram of a simplified block of an example automated optimal path design drilling program.
Figure 2:
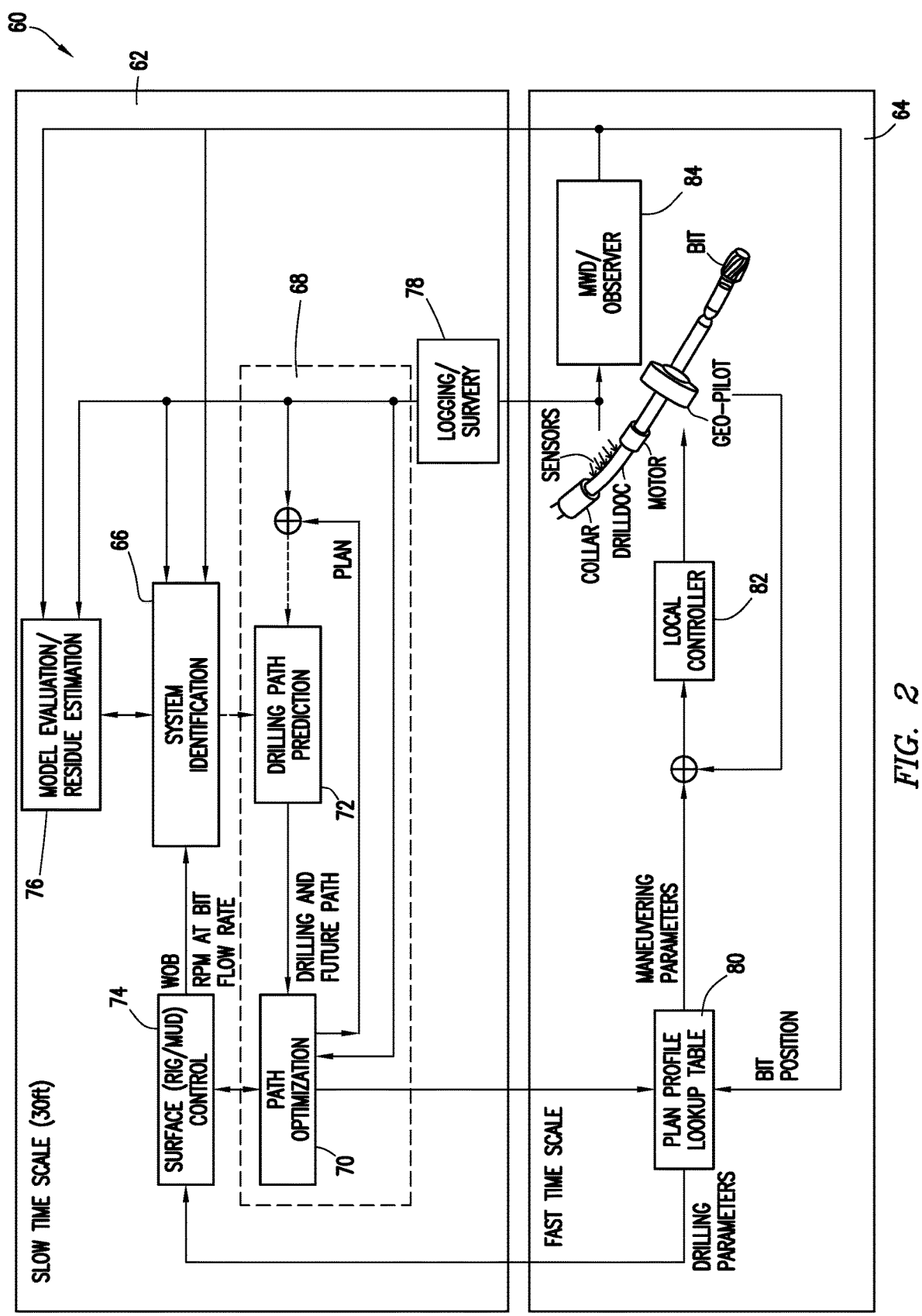
FIG. 2 is a detailed schematic drawing of an example automated optimal path design drilling program.

Computer/controller 38 may operate automated drilling program 60 (e.g., FIG. 1B, 2, etc.). Automated drilling program 60 may be installed, may function, and may operate autonomously on computer/controller 38 or other information handling system. FIG. 1B illustrates an example basic system overview of automated drilling program 60. During operation, automated drilling program 60, may function using a system identification module 66, an optimization function 68, and a fast time scale implementation 64.

System identification module 66 may create a path/drilling dynamics model based upon the information collected from the real drilling 64. System identification module 66 may operate as an independent information handling system, separate and apart from other information handling systems. The information handling system operating system identification module 66 may communicate with other information handling systems by any suitable means of communication. Suitable means of communication may be, but is not limited to, any form of wireless communication and any form of cable communication. In examples, system identification module 66 may operate as one of many software programs, communicating with other software programs within the same information handling system. The system identification module 66 may automatically identify and calibrate the drilling process dynamics model and the drill path model based on survey/logging, surface inputs (hook load, torque), and real-time MWD data. System identification module 66 aims at modeling the drilling path/dynamics as a function of the surface inputs, bit wear, and rock mechanics, which can be calibrated by surveys and real-time MWD data. Updating the model may be performed in real time during drilling and the updated model may be adopted in optimization function 68.

Optimization function 68 may take into account the measured/estimated bit position and compare it to the current path plan. A future drilling path may be predicted using the model created by system identification module 66. When a deviation is detected in the drilling path, optimization function 68 may update/recalculate the best path to reach a target area 92. Optimization function 68 may function separate and apart from system identification module 66 or optimization function 68 may be part of system identification module 66. An information handling system may run and support optimization function 68 and system identification module 66. Or, in further examples, optimization function 68 may operate an information handling system which may be separate and apart from another handling system operating system identification module 66. Both information handling systems may communicate with each other by any suitable means of communication. Suitable means of communication may be, but is not limited to, any form of wireless communication and any form of cable communication. The path chosen by optimization function 68 may be constrained by the user to take into account specific underground formations, surface operations, and/or anti-collision requirements. Furthermore, optimization function 68 may calculate the optimal starting point to maneuver a bit (such as drill bit 14 shown on FIG. 1A), the optimal entry angle to formations, the optimal dogleg severity/length of turn section, and the optimal surface operation inputs, such as hookload, torque, and pump rate. Taking into account the constraints, a hybrid cost function may be constructed as a weighted summation of various optimization merits. The cost function may be defined as below, $$\text{Cost} = \int [a_1 \text{ROP}^2 - a_2 r_d^2 - a_3 w_b^2 - a_4 w_{RSS}^2 + a_5 \eta_c^2 - a_6 u^2 + a_7 \eta_{hc} + a_8 (\text{Quantified path geometry})^2]$$

wherein
u=surface inputs
ROP=Rate of Penetration
$r_d$=energy dissipation ratio
$w_b$=bit wear
$w_{rss}$ wear of the rotary steerable system $$\eta_c = \text{cutting efficiency} = \frac{\text{actual cutting depth}}{\text{max} \cdot \text{achievable cutting depth}}$$

$$\eta_{hc} = \text{hole cleaning efficiency} = \frac{\text{volume of chips removed}}{\text{ROP}}$$

$a_1, a_2, a_3, \ldots$ =the weighted value of each cost

Quantified Path Geometry may include, but is not limited to, path costs that user desires. For example, the user may want to have the least deviation from the planned path or have the path such that it involves least number of turns (e.g., longest possible hold sections) or have lowest dogleg severity or a combination of these. For example, an equation that may be used to have the least deviation may be defined as follows:

$$\text{Cost}_1 = \int (\text{plan}_{org}(N,E,H) - \text{plan}_{new}(N,E,H))^2 \, dH$$

where, N, E, H represent North, East and Height respectively and $\text{plan}_{org}$ and $\text{plan}_{new}$ are the original plan and the updated plan.

An example of an equation involving the least number of turns (i.e., more hold sections) may be defined as follows:

$$\text{Cost}_2 = \int \text{CL}_{hold}$$

where, $\text{CL}_{hold}$ is the course length of the hold section.

The optimization of the cost function may take several constraints into account. For example, the input u may have physical limitations that become a set of constraints on the optimization. The constraints may also be user defined, for example specifying upper and lower thresholds to dogleg severity or turn rate. Information used to update the model in system identification module 66 or optimization function 68 may be received from slow time scale downhole survey/logging 78 or from a fast time scale implementation 64.

During drilling, the bit position may be estimated from the MWD data through an observer algorithm through fast time scale implementation 64. Fast time scale implementation 64 may function using sensors on drilling system 2 to send information to automated drilling program 60, which may allow automated drilling program 60 to alter the drilling path quickly. Comparing the estimated bit position (may be represented using north, east, and height—"NEH") with the profile derived by optimization function 68, the desired drilling/maneuvering parameters at the current bit position may be found. The looked-up maneuvering parameters may then be automatically implemented through a local controller 82 (e.g., FIG. 2), while the drilling operation parameters are transmitted to the surface. As only few drilling parameters may be transmitted, a very limited bandwidth may be used. The transmission delay may be compensated by the prediction of the bit position. Bit position may be predicted using a drilling process model. The model may be physics based, statistics based or a combination of both. Alterations to the model using information provided by fast time scale implementation 64 may automatically update the direction of automated drilling program 60, placing automated drilling program 60 on an optimized path to reach a designated target area, such as designated target area 92 discussed below with reference to FIG. 6. Optimizing a path may occur when a path deviation is detected or when a re-optimization command is received. System identification module 66 may take the information obtained by fast time scale implementation 64 and identify the real drill path model. Optimizing using the identified drill path model may be repeated adaptively with the previous steps, until the automated drilling program 60 reaches its target area. Optimization of the drill path model may be done automatically using computer/controller 38 (e.g., FIG. 1A), which may significantly reduce the costs associated with drilling.

FIG. 2 illustrates a detailed schematic drawing of the example automated drilling program 60. As described above, automated drilling program 60 may function using system identification module 66, an optimization function 68, and a fast time scale implementation 64. Initially a desired drilling path may be entered into computer/control 38 (e.g., FIG. 1). Computer/control 38 may identify the model of the real drilling path/dynamics using automated drilling program 60. Automated drilling program 60 may optimize a desired drilling path based on the identified model, the original desired path and the constraints entered into computer/controller 38. The optimized path may be automatically programmed into drilling system 2 to drill below the earth's surface. Automated drilling program 60 may further automatically calibrate the drilling path/dynamics model to match the real drilling path/process. During drilling, the path may deviate from the original planned path, which automated drilling program 60 may automatically detect. An observer may function to predict the position of the bit and the drilling path. Automated drilling program 60 may then optimize the drilling path based on the calibrated model and the predicted path, to reach the target area without using additional resources.

Automated drilling program 60 may process drilling data in real-time, allowing for an immediate and real-time correction to the drilling path. Properly processing information in real-time may require automated drilling program 60 to be partitioned into two distinct time scales. A slow time scale 62 which may operate in semi-real-time and a fast time scale 64 which may operate in real-time. For example, slow time scale 62 may update every thirty feet of drilling and fast time scale 64 may update every one foot of drilling. It should be noted that these depths are arbitrary and may change based on a user's requirements or available drilling equipment. In general, the fast time scale 64 updates at a faster rate than the slow time scale 62. Furthermore, depth of drilling may be replaced by time periods. For example, slow time scale 62 may update every ten seconds and fast time scale 64 may update ever second. Times and depths at which automated drilling program 60 updates may be arbitrary and base upon underground formations, user knowledge of the area, and current drilling operations.

During drilling operations, slow time scale 62 may comprise a variety of functions that act as both inputs and outputs to optimized drilling operations. Slow time scale 62 may obtain measurements from sensors, not illustrated, around or within drilling system 2. With additional reference to FIG. 1A, these measurements may be communicated to the surface or taken when drill stem 12 is removed from borehole 6 for maintenance. Individual functions found in slow time scale 62 may comprise system identification module 66, optimization function 68, surface control 74, model evaluation/residue estimation 76, and logging/survey 78. When beginning drilling operations, a user may identify a path for drilling system 2 to follow. In other examples, a target may be identified by the user and the path may be designed by automated drilling program 60. The chosen path may be placed as an input into computer/controller 38 (e.g., FIG. 1), which may model the path using system identification module 66. System identification module 66, during drilling operations, may further update the drilling path/dynamics model. However, at the beginning of drilling operations, the drilling model produced by system identification module 66 may be transferred to drilling system 2, which may begin drilling operations. During drilling operations, system identification module 66 may constantly receive inputs from logging/survey 78, MWD/observer 84, surface control 74, and model evaluation/residue estimation 76. These inputs may be used to automatically calibrate and alter the drill path, drill path model and/or dynamics model. For example, surface operation inputs comprising information regarding the dogleg severity, tool face, and bit walk rate may be used to update the drilling model. Bit walk rate may be a function of the formation, bit type and wear, path orientation, surface inputs, and bottomhole assembly ("BHA") dynamics. Furthermore, surface operation inputs may comprise bit dynamics, vibration and position of the bit, bit ware, and the rock mechanics. System identification module 66 aims at automatically modeling and calibrating the drilling path/dynamics as a function of the surface inputs, bit ware, and rock mechanics. With additional reference to FIG. 1A, these inputs may update the original model to replicate the location of drilling system 2 within the earth's surface and it's relation to the originally modeled path. The information may be evaluated by model evaluation/residue estimation 76 to determine acceptability of drilling system 2 current position and originally modeled path.

Model evaluation/residue estimation 76 may calculate the error between predictions of states estimated by the newly identified model and compare it to inputs received from MWD/observer 84 and logging survey 78. Inputs comprising of downhole tool position, orientation, acceleration, formation data, and other like information may be used to determine residue. A residue, or error rate, may be produced.

Optimization function 68 may be divided into two separate functions, a drilling path prediction 72 and a path optimization 70. Drilling path prediction 72 may compare inputs from logging/survey 78 and outputs from path optimization 70. Both may be used to calibrate the drilling path. The predicted drilling path may provide information such as estimated speed, estimated revolutions per minute (RPM), estimated weight on bit (WOB), and predicted direction. Sensors, not pictured may be used to obtain information needed to determine RPM, WOB, and direction of bit 14. This information may be sent to path optimization 70. Path optimization 70 may take inputs from surface control 74 and logging/survey 78 to produce and/or update an optimized path based of the predicted drilling path and selected target area 92. Design of an optimized path may also take into account constraints from surface control 74.

Figure 3:
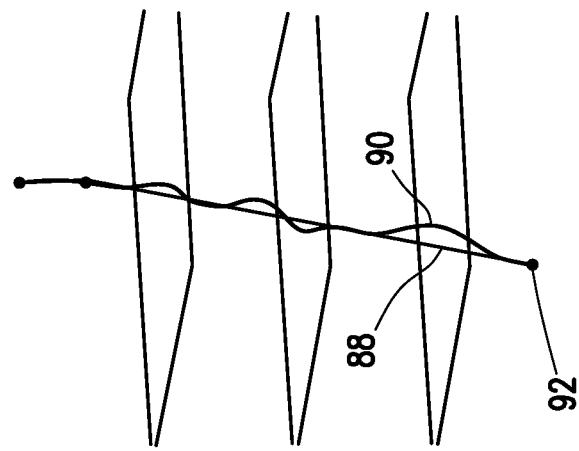
FIG. 3 is an example chart, illustrating the operational scope of adaptive constraints system.

Illustrated in FIG. 3 is a graphical representation of the operating constraints placed upon drilling system 2. Constraints placed upon drilling system 2 may be, and not limited to, RPM, WOB, and total vertical depth (TVD) of the drill bit ranges in which drilling system 2 may operate. Together they may form an operational space 86, as illustrated in FIG. 3. Operational space 86 may prevent excessive wear, vibrations, or failure of drilling system 2. To optimize the drilling path to reach target area 92, path optimization 70 may design optimal path constrained by the operational space 86. For example, if drilling system 2 has a TVD of one hundred feet with one hundred and fifty pounds WOB, surface control 74 may choose from the appropriate RPM within operational space 86 using the graph in FIG. 3. Information regarding a drilling system's 2 RPM, WOB, and TVD are may be provided by sensors around drilling system 2. Information may be sent from the sensors to surface control 74. Referring back to FIG. 2, surface control 74 may distribute the sensor information to system identification module 66 and/or path optimization 70. This information, as described above, may optimize and/or update the path of drilling system 2.

Once a path has been optimized, path optimization 70 may transfer the optimized path to fast time scale 64 functions. Fast time scale 64 functions may comprise a plan profile lookup table 80, a local controller 82, and a MWD/observer 84. Plan profile lookup table 80 may receive the optimized path from path optimization 70 and further may receive information from MWD/observer 84 as to the position of bit 14. The bit position and optimized path may be compared and the maneuvering parameters used to place bit 14 along the optimized path may then be transferred to local controller 82. Furthermore, plan profile lookup table 80 may update and/or add drilling parameters to surface control 74. These may change operational space 86 produced by surface control 74, which may further optimize the drilling path through each optimization of the drill path.

Local controller 82 may control the drilling direction of drilling system 2. Receiving input from plan profile lookup table 80, local controller 82 may maneuver drilling system 2 along the optimized path. Feedback from sensors along the drill system 2 may be fed to local controller 82, allowing local controller 82 to maneuver drilling system 2 along the optimized path. The direction, location, speed, RPM, WOB, and TVD may be recorded and updated, accordingly, by MWD/observer 84 and logging/survey 78. All updated information may be recycled through automated drilling program 60, allowing automated drilling program 60 to continuously optimize the drilling path on its way to target area 92. Optimization may allow automated drilling program 60 to reduce cost, time, material, and error in drilling.

Figure 4:
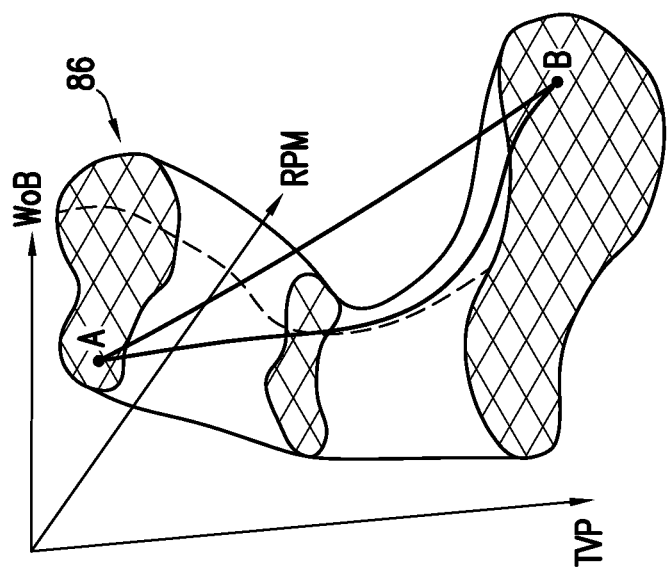
FIG. 4 illustrates the current system as used by the drilling industry to reach a point below the earth's surface.

How cost is reduced in drilling may further be illustrated in FIG. 4. FIG. 4 illustrates a planar perspective of a chosen drill path and an actual drill path, the actual drill path being performed by current methods using a human operator. The current system of drilling may require human operators with years of experience to guide drilling system 2 along selected path 88 to target area 92. As drilling system 2 shifts and moves due to formation changes, downhole vibrations and the rotation of the drill bit, an operator must manually move drill bit 14 back onto selected path 88. Experience plays a large role in the ability of an operator to successfully guide drilling system 2 back along selected path 88. FIG. 4 illustrates a manually drilled path 90 with selected path 88. As illustrated, manually drilled path 90 may be erratic and filled with many twists and turns as the human operator tries to maneuver drilling system 2 back on selected path 88. Twist and turns adds length to the wellbore, increasing cost and time to reach target area 92. While manually drilled path 90 may not be as erratic as others, manually drilled path 90 may tend to have more corrections on the way to target area 92. It should be understood that the manually drilled path 90 shown on FIG. 4 is hypothetical but is provided to illustrate the difficulty in successfully guiding drilling system 2 along the selected path 88.

Figure 5A:
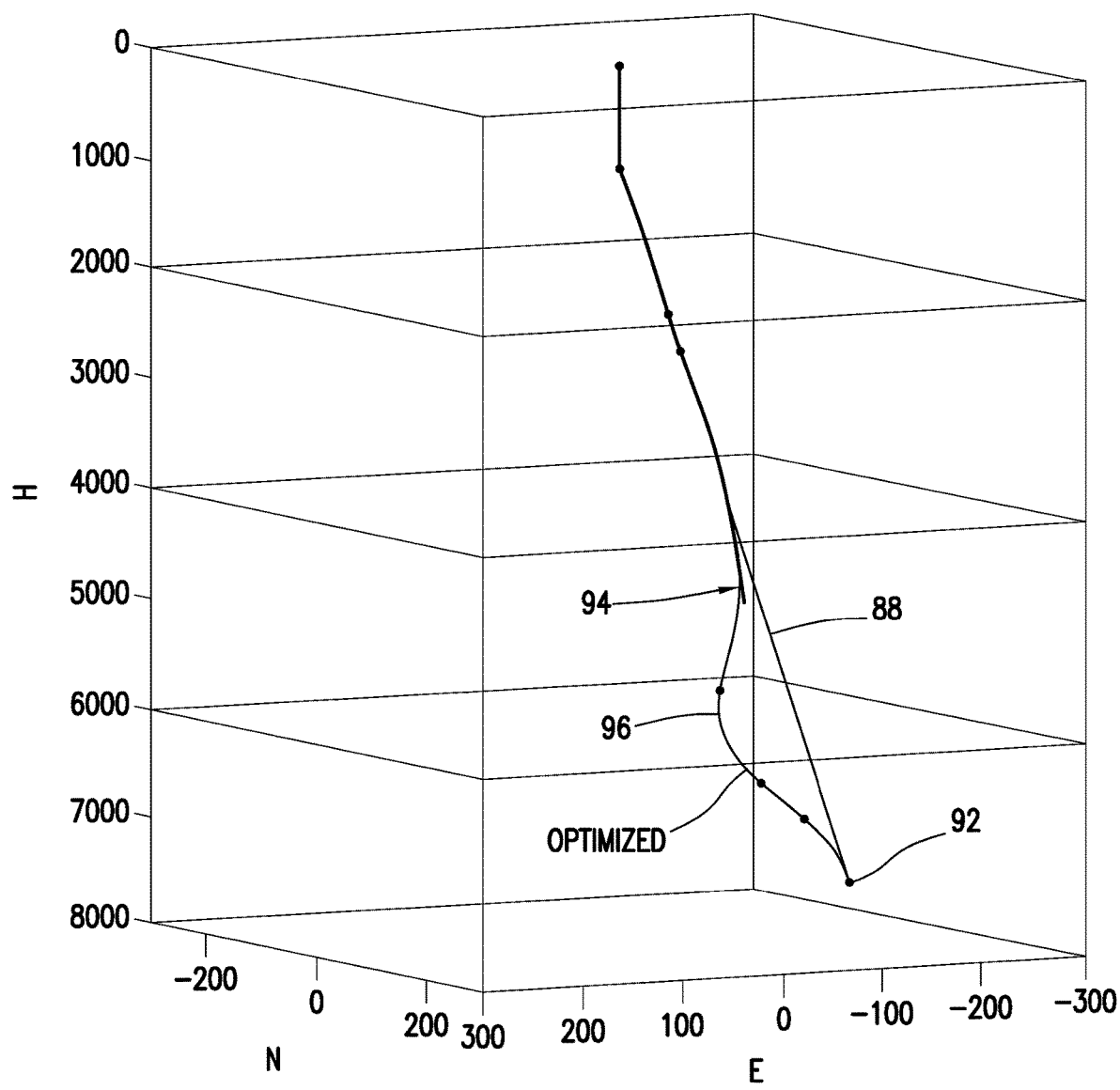
FIG. 5A illustrates an example drilling operation being optimized as it descends into the earth to a target area.
Figure 5B:
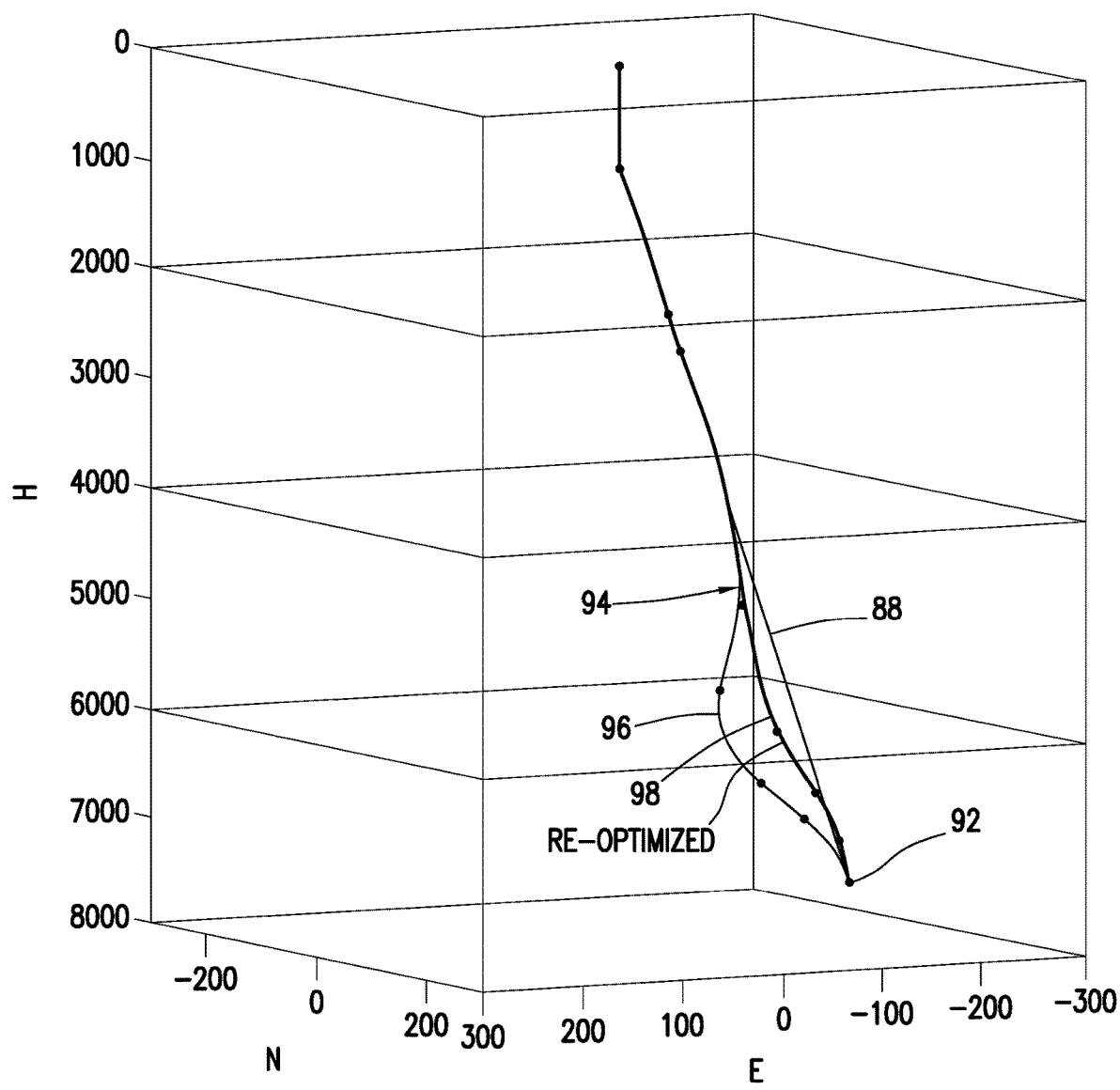
FIG. 5B illustrates an example drilling operation that is constantly optimizing its descent into the earth, to a target area.

FIG. 5 illustrates a path optimization case with the objective of a path with least turning effort/maneuvering frequency. FIGS. 5A and 5B illustrate automated drilling program 60 as it guides drilling system 2 (e.g., FIG. 1) along selected path 88 to target area 92. Automated path 94 illustrates the drilling direction of drilling system 2 as controlled by automated drilling program 60. In FIG. 5A, automated path 94 starts to deviate from selected path 88. Due to the deviation, automated drilling program 60 may optimize a first optimized path 96 in which drilling system 2 may take to get to target area 92. As drilling system 2 moves along the first optimized path 96, automated drilling program 60 optimizes the drill path again, based on current conditions and parameters. As illustrated in FIG. 5B, second optimized path 98 is produced and modeled from the optimization of automated drilling program 60. Drill system 2 may then be guided to the second optimized path 98 using automated drilling program 60. Second optimized path 98 may be used as a final path to target area 92. The optimization of selected path 88 by automated drill system 60 may happen many times during drilling. Optimization leads to a reduction in cost, time, and material used to reach target area 92.

A method of operating an automated drilling program may comprise drilling to a target location along a drill path, updating a drilling path module based at least on data obtained during the step of drilling to the target location, creating a modified drill path to the target location based on at least the drilling path model in real-time as the step of drilling to the target location along the drill path is being performed, and drilling to the target location along the modified drill path. The method may further comprise creating a modified drill path bound by an operational space. The operational space may be constrained by factors including, but not limited by, weight on bit, revolutions per minute, and total vertical depth. The method may further comprise comparing the drill path to an original drill path. The step of comparing the drill path to the original drill may produce an error. A modified drill path may be created if the error exceeds a predetermined value. The steps of updating a drill path model and creating a modified drill path may be repeated continuously while drilling to the target location. The modified drill path may be created based on a current position of a drill bit as compared to where the drill bit should be on the original drill path.

An automated drilling system may comprise a drilling assembly, wherein the drilling assembly may comprise a drilling rig, a drill stem, or a drill bit. The automated drilling system may further comprise an information handling system coupled to the drilling assembly, the information handling system may comprise an automated drilling program that may be configured to update a drilling path model based at least on data obtained from the drilling assembly, and create a modified drill path to a target location based at least on the drilling path model in real-time as the drilling assembly is drilling to the target location. The drilling path model may comprise an optimization function that includes a drilling path prediction function and a path optimization function. The drilling path prediction function may compare inputs from a logging and/or a survey or outputs form the path optimization. The drilling path prediction function may provide information regarding speed of the drill bit, revolutions per minute of the drill bit, weight on bit, or direction of the bit. The drilling assembly may further comprise sensors communicatively coupled to the information handling system. The automated drilling program may comprise at least one of a model evaluation function, a system identification module, a surface control function, a logging function, or an optimization function. The optimization function may comprise a path optimization function or a drilling path prediction function. The drilling path prediction function may use a plurality of sensors on the drill assembly to establish where location of the drill bit of the drill assembly. The drilling path prediction function may model a new path based on a current position of the drill bit as compared to where the drill bit may be on the original modeled path, where the path optimization may be bound by an operational space. The operational space may comprise weight on bit, revolutions per minute, or total vertical depth. The optimization function may calculate an optimal path to the target location that includes an optimal starting point to maneuver the drill bit of the drill assembly. The system may further comprise a local controller that may control the drill stem and guide the drill bit to a target area based on the drilling path model.

Therefore, the present invention is well adapted to attain the ends and advantages mentioned as well as those that are inherent therein. The particular examples disclosed above are illustrative only, as the present invention may be modified and practiced in different but equivalent manners apparent to those skilled in the art having the benefit of the teachings herein. Although individual examples are discussed, the invention covers all combinations of all those examples. Furthermore, no limitations are intended to the details of construction or design herein shown, other than as described in the claims below. It is therefore evident that the particular illustrative examples disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A method for operation of an automated drilling program comprising:
   drilling to a target location along a drill path;
   updating a drilling path model with a cost function using data obtained during the step of drilling to the target location;

creating a modified drill path to the target location based on at least the drilling path model in real-time as the step of drilling to the target location along the drill path is being performed, wherein the modified drill path is bound by an operational space, wherein the operational space uses constraints comprising weight on bit, revolutions per minute, or total vertical depth;

updating the modified drill path on a current position of a drill bit based at least in part on the where the drill bit should be on the drill path model; and drilling to the target location along the modified drill path.

2. The method according to claim 1, further comprising comparing the modified drill path to an original drill path.

3. The method according to claim 2, wherein the comparing the modified drill path to the original drill path produces an error.

4. The method according to claim 3, wherein the modified drill path is created if the error exceeds a predetermined value.

5. The method according to claim 1, wherein the steps of updating a drill path model and creating a modified drill path are repeated continuously while drilling to the target location.

6. The method according to claim 1, wherein the modified drill path is created based on a current position of a drill bit as compared to where the drill bit should be on the original drill path.

7. The method according to claim 1, wherein the data used for updating the drilling path model with the cost function includes a rate of penetration, surface inputs, an energy dissipation ratio, bit wear, wear of a rotatory steerable system, cutting efficiency, hole cleaning efficiency, or a quantified path geometry.

8. An automated drilling system comprising:

a drilling assembly, wherein the drilling assembly comprises a drilling rig, a drill stem, and a drill bit; and an information handling system coupled to the drilling assembly, wherein the information handling system comprises an automated drilling program that is configured to:

update a drilling path model with a cost function using data obtained from the drilling assembly; and create a modified drill path to a target location based at least on the drilling path model in real-time as the drilling assembly is drilling to the target location, wherein the modified drill path is based at least in part on a current position of the drill bit as compared to where the drill bit should be on the drilling path model, and wherein the modified drill path is bound by an operational space, wherein the operational space uses constraints comprising weight on bit, revolutions per minute, or total vertical depth.

9. The system according to claim 8, wherein the drilling path model comprises an optimization function that includes a drilling path prediction function and a path optimization function.

10. The system according to claim 8, wherein the drilling path prediction function compares inputs from a logging and/or a survey and outputs from the path optimization.

11. The system according to claim 10, wherein the drilling path prediction function provides information regarding speed of the drill bit, revolutions per minute of the drill bit, weight on bit, and direction of the bit.

12. The system according to claim 8, wherein the drilling assembly further comprises sensors communicatively coupled to the information handling system.

13. The system according to claim 8, wherein the automated drilling program comprises at least one of a model evaluation function, a system identification module, a surface control function, a logging function, or an optimization function.

14. The system according to claim 13, wherein the optimization function comprises a path optimization function and a drilling path prediction function.

15. The system according to claim 14, wherein the drilling path prediction function uses a plurality of sensors on the drill assembly to establish where location of the drill bit of the drill assembly.

16. The system according to claim 14, wherein the optimization function calculates an optimal path to the target location that includes an optimal starting point to maneuver the drill bit of the drill assembly.

17. The system according to claim 8, further comprising a local controller that controls the drill stem and guides the drill bit to a target area based on the drilling path model.

* * * * *